March 14, 1950     E. COSTELLO     2,500,805
EXERCISING DEVICE FOR HORSES
Filed March 20, 1945     2 Sheets-Sheet 2
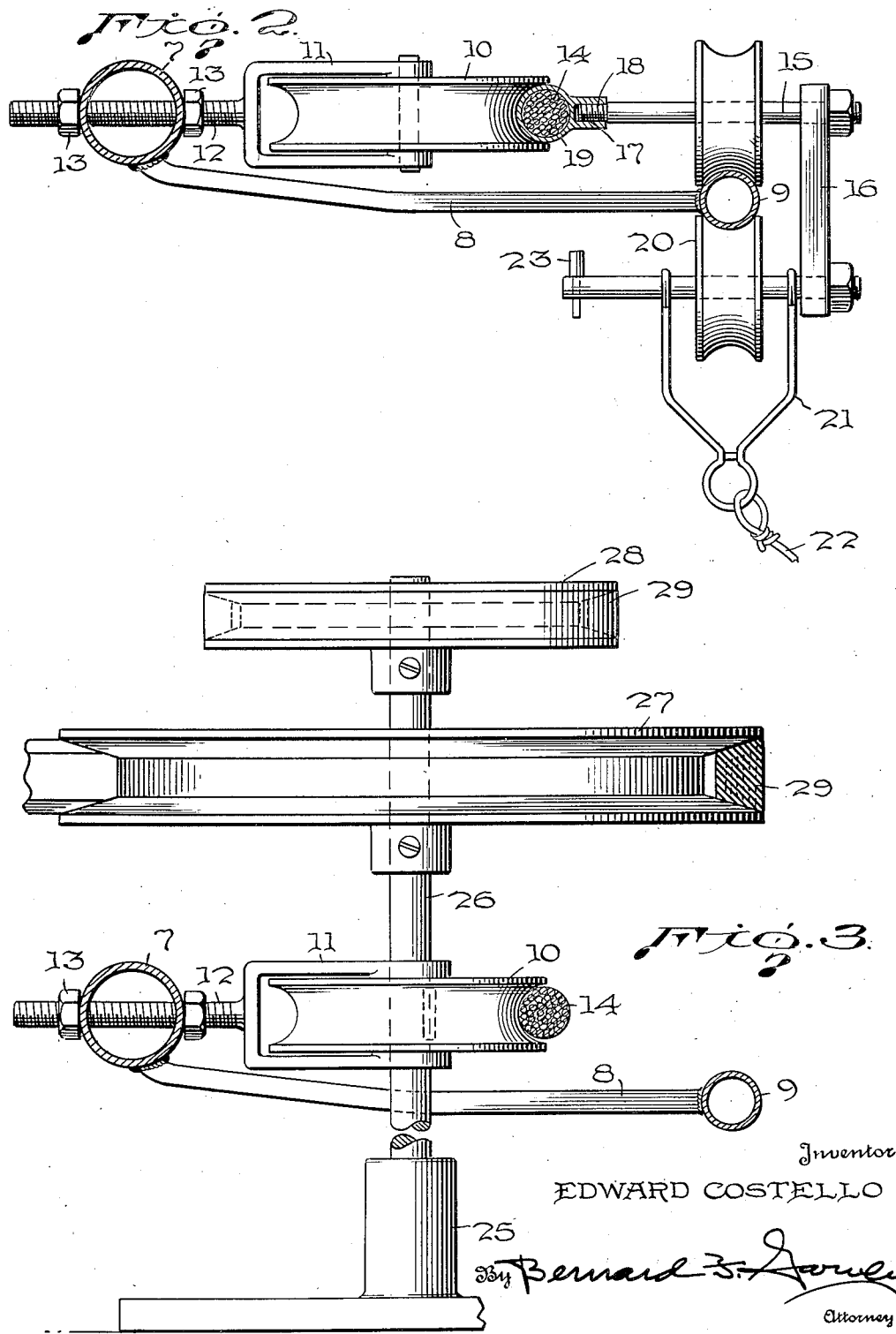
Inventor
EDWARD COSTELLO
By Bernard F. Gowley
Attorney Patented Mar. 14, 1950

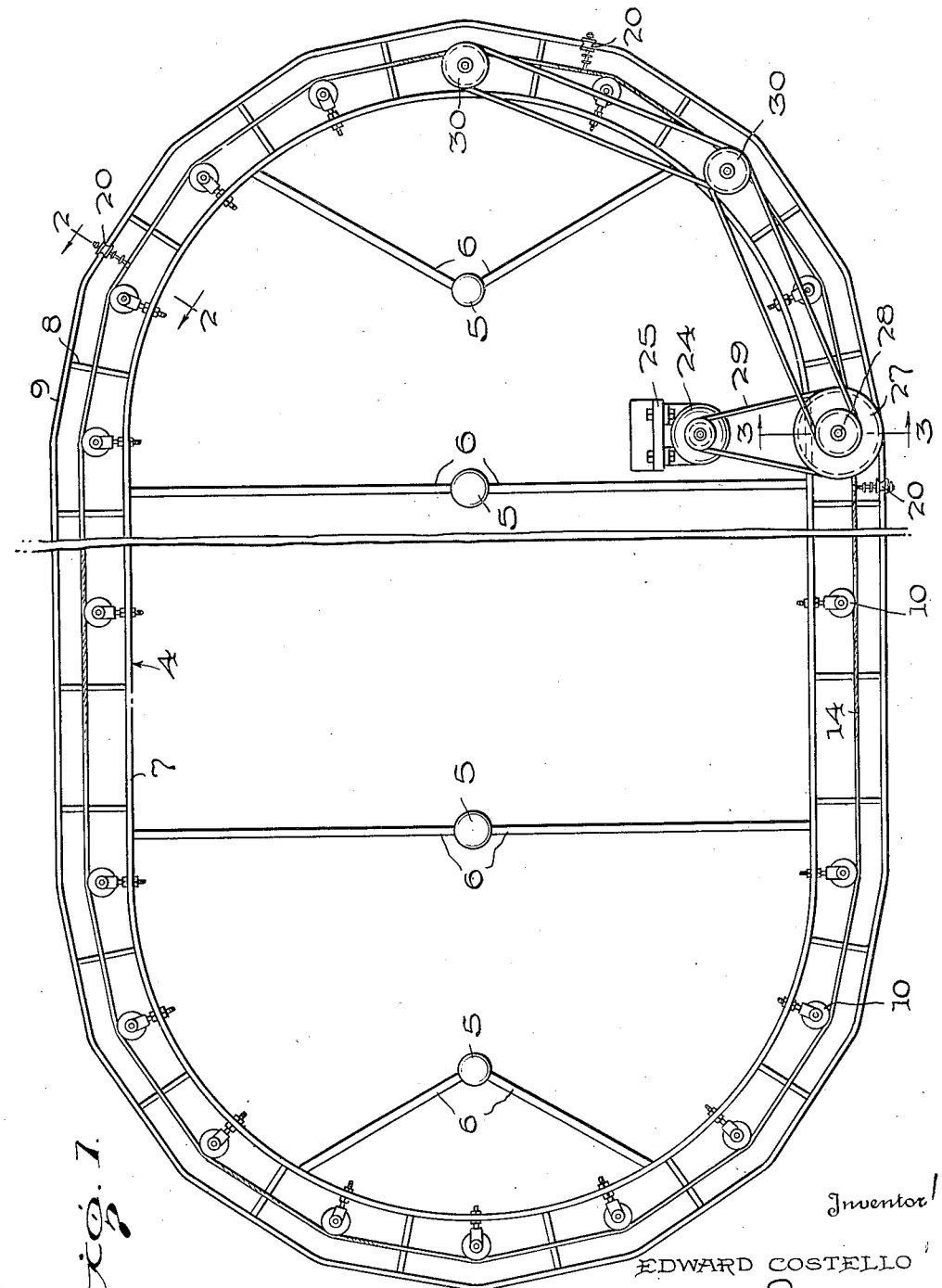

2,500,805

UNITED STATES PATENT OFFICE 2,500,805

EXERCISING DEVICE FOR HORSES

Edward Costello, Washington, D. C.

Application March 20, 1945, Serial No. 583,677

2 Claims. (Cl. 119—29)

The present invention comprises an exercising device for horses especially adapted for use after races or so-called "work-outs" and has for an object the provision of means which permit predetermined fixation of the rate of speed at which the horse or horses is or are permitted to travel.

Other objects of the invention include mechanical means to which one or more horses may be tethered and walked or raced, at the option of the operator, through a predetermined path, without danger of injury; to provide means for leading a horse by a halter or other conventional head harness without torsional strain on the head or neck, and without causing the horse to resort to an unnatural mode of locomotion; to provide an elevated track which may be erected in a field and equipped with suitable top and side covering or may be mounted in a barn; to provide a power operated exercising device which limits the path of movement of the horses yet is characterized by ample flexibility to insure consummate exercise with an absence of tenseness or restraint; and to provide a simple and relatively inexpensive device which will occupy a minimum amount of space and will last for an indefinite period of time.

Other objects of the invention will be apparent from the following description of the present preferred form of the invention, taken in connection with the accompanying drawings, wherein:

Figure 1 is a top plan view of an exercising device constructed in accordance with the present invention;

Figure 2 is a transverse sectional view taken on the line 2—2 of Figure 1, looking in the direction of the arrows, and Figure 3 is a similar view taken on the line 3—3 of Figure 1, looking in the direction of the arrows.

The device of the present invention consists of a supporting structure which is adapted to carry one or more horse tethers, the tether being part of a unit, hereinafter described in detail, which is moved at variable speeds by power means.

The supporting structure of the present invention includes an elevated track assembly 4 which, in the present instance, is shown to be of substantially ovoidal configuration and is held at the desired elevation by supporting posts 5, from each of which braces or ribs 6 extend. The outer ends of the ribs are fixedly engaged with a continuous frame 7 which may be of tubular construction, as shown in Figures 2 and 3, and forms the inner perimeter of the track assembly 4. The frame is equipped with a plurality of supporting arms 8, the free end of each of which is secured to and supports a rail 9 the rail being likewise continuous and forming the outer perimeter of the track assembly. The frame 7 is provided at intervals with horizontally arranged sheaves 10 each being rotatably mounted on a vertical axis between the arms of a yoke 11. A threaded shaft 12 issues from the closed end of each yoke 11 and extends through the frame 7. Each shaft 12 carries a pair of jam nuts 13, one on each side of the frame 7, as shown in Figure 2. This permits adjustment of the yoke 11 and sheaf 10 for a purpose which will presently appear. The track assembly also includes a cable 14 which is trained over the sheaves 10 and is movable under pressure in a circuitous path, during which operation the sheaves 10 act as idlers in a manner well known in the art. By adjustably mounting the sheaves 10, variation of the tension of the cable 14 is permitted in an obvious manner.

A horse tethering unit is adapted to be movably mounted on the rail 9 and in the present instance, consists of a pair of parallelly arranged rods 15 connected by a plate 16. The rods are arranged in spaced relation, one above the other, as illustrated advantageously in Figure 2. The inner end of the upper rod is screw threaded, as indicated at 17, and is adapted for engagement in a complementally threaded socket 18 formed on a cable embracing band 19. Each of the rods or shafts 15 has a wheel 20 rotatably mounted thereon, the periphery of which is concave to conform to the contour of the rail, with which the wheel is engaged. The lower shaft pendently carries the tether yoke 21 to which a halter rope or strap 22 is adapted to be tied. The tether yoke may be of U shape, construction with the arms of the U straddling the lower of the wheels 20 and loosely engaged with the lower of the shafts 15 to permit lateral movement of the yoke in an obvious manner. To limit the extent of movement of the yoke on its shaft, a pin 23 is provided.

It is within the contemplation of this invention to propel the cable 14 by suitable power means such as indicated at 24. This may consist of a motor mounted on a suitable supporting base 25, the motor being operatively connected to the cable 14 in any manner well known in the art. For this purpose, I have, in Figure 3, shown a power shaft 26 which is keyed to one of the sheaves 10. The shaft 26 extends upwardly through said keyed sheaf and carries a pair of sheaves 27 and 28 differing in diameter. Each of the sheaves is driven by a V belt 29 or the like, the larger of the sheaves being in direct connection with the motor 24 as shown in Figure 1. The upper or smaller sheaf 28 is connected for direct drive, with one or more of the sheaves 10 as indicated at 30.

In use of this invention a horse is tethered to each of the tethering units and the unit operated by movement of the cable 14. As above indicated, the cable may be operated by power means, if desired, and the speed varied at the option of the operator. Where the exercising device of the present invention is mounted in a barn, obviously no further covering for the device is required. Where, however, the device is mounted in a field, I prefer to employ a stationary roof structure for the device and rolling canvas sides, operated in a manner well known in the art.

While I have herein described a preferred embodiment of the invention, I am of course aware that various changes may be made within the scope of the claims hereto appended.

What I claim is:

1. An exercising device comprising an endless rail, an endless cable provided with hitching connections for a number of horses, each of said hitching connections embodying a plate having a pair of parallel rods extending therefrom, one of said rods being disposed above and the other of said rods disposed below said rail, pulley wheels on the rods engaging said rail, a positive connection between the upper one of said rods and the cable, and a tether yoke supported by the other of said rods.

2. An exercising device for horses comprising an endless rail, an endless cable provided with hitching connections for a number of horses, each of said hitching connections embodying a plate having a pair of parallel rods extending therefrom, one of said rods being disposed above and the other below said rail, pulley wheels on the rods engaging said rail, and a tether yoke supported by the lower of said rods and laterally movable thereon to permit corresponding lateral movement of the head of the tethered horse.

EDWARD COSTELLO.

REFERENCES CITED

The following references are of record in the file of this patent:

UNITED STATES PATENTS

| Number | Name | Date |
|---|---|---|
| 138,873 | Emerson | May 13, 1873 |
| 299,393 | Jenkins | May 27, 1884 |
| 379,485 | Mitchell | Mar. 13, 1888 |
| 779,243 | Smith | Jan. 3, 1905 |
| 1,252,306 | Sassil | Jan. 1, 1918 |
| 1,294,813 | Lammert et al. | Feb. 18, 1919 |
| 1,717,246 | Perling | June 11, 1929 |
| 1,747,388 | Pearson | Feb. 18, 1930 |
| 1,755,676 | Twiford et al. | Apr. 22, 1930 |
| 1,973,927 | Motley | Sept. 18, 1934 |

FOREIGN PATENTS

| Number | Country | Date |
|---|---|---|
| 8,402 | Australia | July 16, 1928 |
| 305,268 | Great Britain | Feb. 4, 1929 |
| 380,132 | Great Britain | Sept. 12, 1932 |